United States Patent [19]

Baumann et al.

[11] 4,132,495
[45] Jan. 2, 1979

[54] DIE HEAD WITH WORKPIECE ACTUATED RELEASE

[75] Inventors: Gerhard Baumann; Hans Tanner, both of Schaffhausen; Xaver Wuchner, Jestetten, all of Switzerland

[73] Assignee: Georg Fischer Aktiengesellschaft, Switzerland

[21] Appl. No.: 846,822

[22] Filed: Oct. 31, 1977

[30] Foreign Application Priority Data

Nov. 4, 1976 [CH] Switzerland ............... 13894/76

[51] Int. Cl.² .................. B23B 39/00; B23G 1/00
[52] U.S. Cl. .......................... 408/74; 10/96 R
[58] Field of Search ............ 408/73, 74; 10/94 R, 10/96 R, 96 T

[56] References Cited

U.S. PATENT DOCUMENTS

| 2,501,601 | 3/1950 | Finn ............... 408/74 |
| 2,556,742 | 6/1951 | Strickland ....... 408/74 |
| 3,735,436 | 5/1973 | Louys ............. 10/96 R |

FOREIGN PATENT DOCUMENTS

489312  6/1970  Switzerland.

*Primary Examiner*—Harrison L. Hinson
*Attorney, Agent, or Firm*—Roylance, Abrams, Berdo & Farley

[57] ABSTRACT

A die head has replaceable radially slidable threading dies moved by a bushing with cams. As the workpiece is threaded to the desired length, its end contacts cam surfaces which move a sensor bolt and a control pin to disengage the bushing from a locked position. The bushing can then move axially to radially retract the threading dies from the workpiece.

9 Claims, 4 Drawing Figures

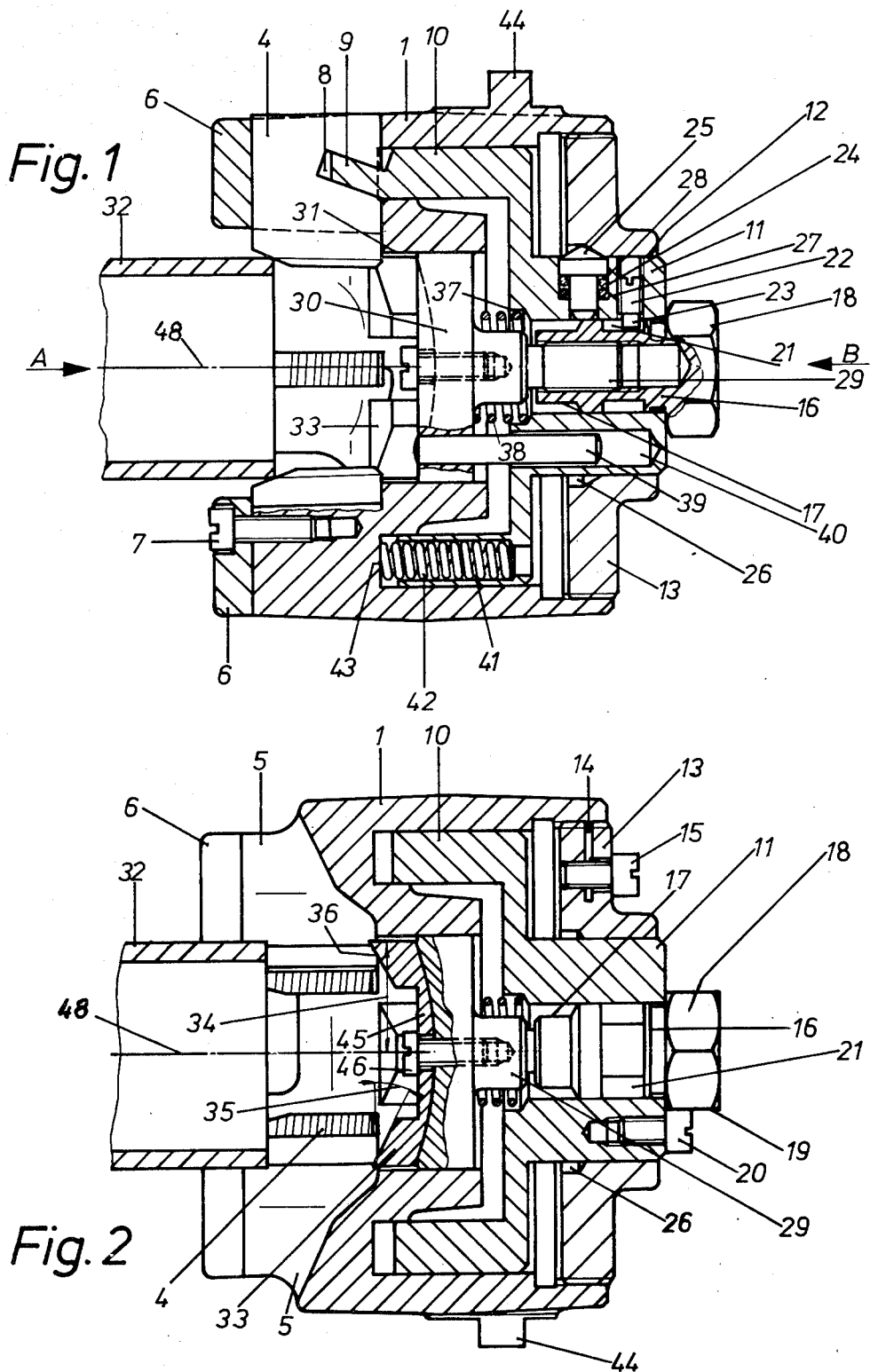

DIE HEAD WITH WORKPIECE ACTUATED RELEASE

This invention relates to a die head with replaceable threading dies having means for withdrawing the threading dies actuated by the workpiece.

BACKGROUND OF THE INVENTION

It is known in the prior art to provide a die head for cutting threads on a tubular member such as a pipe wherein the thread cutting dies are replaceable and are movable away from the workpiece after the threads have been cut. Such a die head is commonly adapted to be attached to and driven by a thread cutting machine or a ratchet wrench.

One such threading die is shown in Swiss Pat. No. 489,312, which includes a die carrier which holds threading dies which protrude radially toward a cavity for receiving the workpiece. An adjusting ring is coupled to two compression springs and is provided with two annular segment-shaped cams, the adjusting ring being twistable or rotatable with respect to the die carrier. The compression springs urge the adjusting ring in a fitting relationship against a stop surface and a locking bolt to hold the cutting dies in operating position. A sensor determining the length of a thread cut on a pipe responds to a predetermined length of thread having been formed on the pipe and lifts the locking bolt from the cams of the adjusting ring.

As a result of this movement, the compression spring becomes active and twists the adjusting ring, as a result of which the threading dies are lifted away from the operating position. In this structure, a part of the sensor and triggering mechanism which must be operated for the retraction of the threading dies is disposed eccentrically and projects outwardly from the die carrier. This projection raises the possibility of danger of accidents when the die head is revolving and is furthermore disadvantageous in that the return of the threading dies to operating position is possible only when the threading die is at rest. Moreover, by the partial narrowing down of the threading dies in the die carrier with respect to the pipe thread to be cut, the runoff of cuttings from the die head is significantly impeded and the cuttings are at the same time partially compressed. As a result of this, the cutting process is interfered with and the service life of the threading dies is therefore noticeably decreased. Furthermore, the reliable operation of the sensor of the triggering mechanism depends largely on the nature of the end of the pipe, a factor which has detrimental influence on the reproducibility of equal lengths of thread on successive pipes.

BRIEF DESCRIPTION OF THE INVENTION

An object of the present invention is to provide an automatically opening threading die which can either be inserted into a ratchet wrench or attached to a thread cutting machine, the cutting dies of which, when used on a thread cutting machine, can be returned to their operating positions without danger even when the die head is revolving and in which the openings between threading dies is dimensioned such that the cuttings run off away from the apparatus perfectly. Furthermore, it is an object of the invention to provide an apparatus of this type in which the opening mechanism actuated by the workpiece is guaranteed without regard for the nature of the end of the pipe.

Briefly described, the invention includes a die head having replaceable threading dies comprising the combination of a die carrier comprising a generally cylindrical body having a hollow interior and a central axis, a plurality of projections extending axially from one end of the body and means defining a generally radially extending slot in each of the projections, a plurality of threading dies, each of the dies being radially slidable in one of the slots, the dies having inwardly facing thread forming surfaces defining a cavity to receive a workpiece, a cover plate on each of the projections, means in each of the threading dies for defining a cam slot opening generally away from the cover plate, a bearing flange axially adjustably mounted in the other end of the body, the bearing flange having a central opening therethrough, a cam bushing in the carrier having a plurality of cams engaging the slots in the threading dies, the cam bushing being axially shiftable relative to the body and having a reduced diameter portion extending into said opening in the bearing flange, means defining a central bore in the reduced diameter portion of the bushing, a control pin in the central bore, the pin being axially adjustable and lockable against movement therein, a sensor bolt coupled to the control pin, a flange on the bolt, and stop cam means on the flange and facing the cavity, the stop cam means having a conical surface contactable by the workpiece for axially moving the flange, the sensor bolt, the control pin and the bushing when contacted and moved by the workpiece, thereby moving the threading dies radially outwardly.

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a side elevation, in partial section, of a die head according to the invention, the section being taken along line I—I of FIG. 3;

FIG. 2 is an elevation, in partial section, of the die head of FIG. 1, the section being taken along line II—II of FIG. 3;

Figure 3:
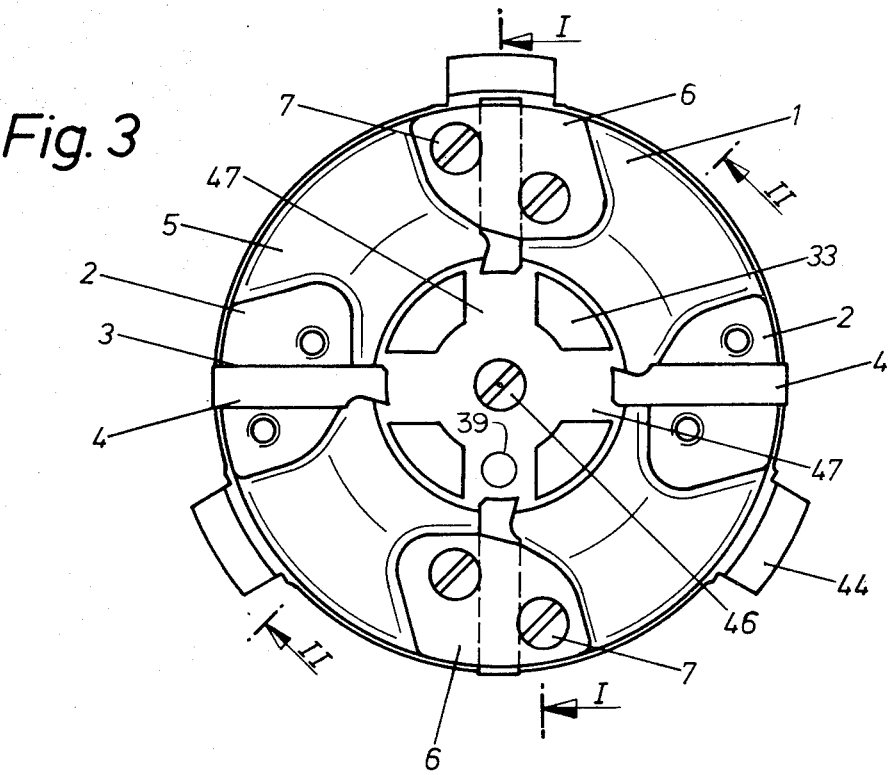
FIG. 3 is a front elevation of the die head of FIGS. 1 and 2 as viewed from the letter A of FIG. 1.
Figure 4:
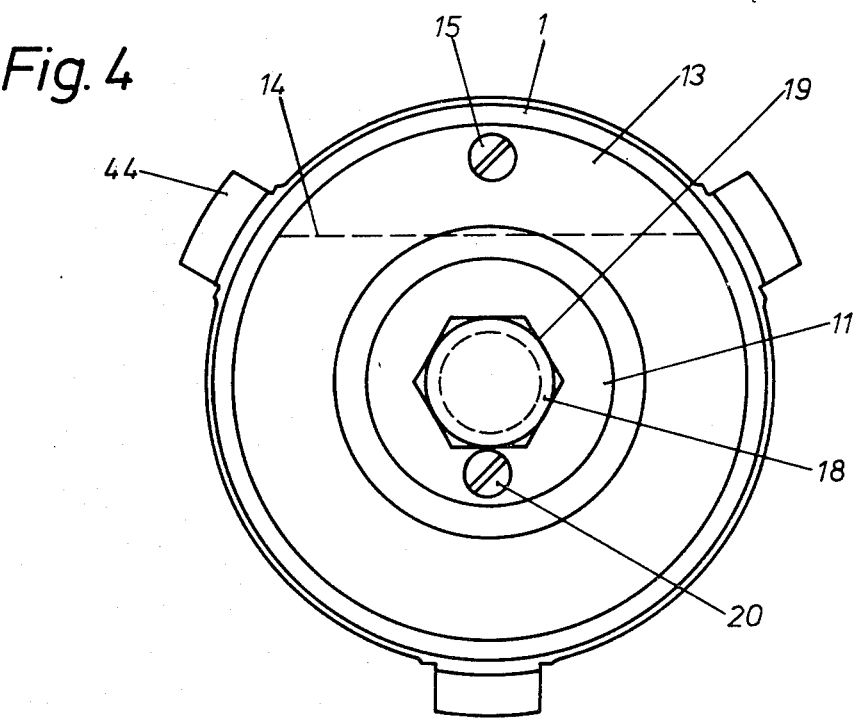
FIG. 4 is a rear elevation of the die head of FIGS. 1-3 as viewed in the direction of arrow B of FIG. 1.

As shown in the figures, the die head includes a die carrier 1 comprising a generally cylindrical hollow body having a plurality of individual uniformly separated and arranged projections 2 protruding axially from one end surface thereof. Each of the projections is provided with a radially extending slot or groove 3 which holds one of a plurality of threading die 4, the inwardly facing surfaces of which are provided with thread cutting teeth in a well-known fashion. The intervals 5 between the projections are dimensioned such that cuttings resulting from the thread cutting operation can easily fall away from the die head without interference with the cutting operation.

On the distal ends of the projections 2, there are provided individual cover plates 6 which are shaped to conform to the exterior shape of the projections, the cover plates being provided to close the ends of grooves 3 to axially retain the cutting dies. The cover plates are connected to the projections as by screws 7 so that the plates are removable for exchange of dies 4.

As best seen in FIG. 1, each of the threading dies 4 is provided with a holding groove 8 which extends inwardly at an angle from one of the narrow longitudinal sides of the threading die. The grooves are disposed in the dies so that they all lie at the same radial distance from the central axis 48 of the die carrier 1. Holding cams 9 extend into and engage the grooves 8, cams 9 being fixedly attached to or integrally formed with a cam bushing 10 which is in the nature of a cup-shaped body and which is axially shiftably disposed in the interior of body 1. The reverse side of cam bushing 10 facing away from holding cams 9 has a reduced portion comprising a hollow cylindrical part 11 which is guided in and extends through a central bore 12 in a bearing flange 13. Flange 13 is provided with external threads and threadedly engages internal threads at the other end of die body 1. The flange is therefore axially adjustable with respect to the body by rotating the flange. As will be seen, this adjustment permits changing of the length of the thread to be cut. Once adjusted, the bearing flange can be locked in place by a locking screw 15 which extends into a threaded opening in a direction parallel with the central axis 48 of the die head and bearing flange. A slot 14 extends radially inwardly from one edge of the bearing flange and the screw passes through that slot, the hole on one side to receive screw 15 being larger than the screw and the hole on the other side of the slot being threaded to engage the screw so that when the screw is tightened, the portions of the flange on either side of the slot are forced toward each other, tending to compress the mating threads and locking the flange in place.

A control pin 16 is inserted in the central bore of the reduced portion 11 of cam bushing 10, peg 16 having a reduced diameter portion 17 toward the front, or left side as seen in FIGS. 1 and 2, of the die head. At the other end, control pin 16 has an enlarged collar or head portion 18 which protrudes beyond the end of reduced portion 11 of the cam bushing. Collar 18 is formed in the shape of a polygon, preferably as an hexagon, and the end of bushing portion 11 has a threaded hole to receive a locking screw 20, the head of which is adjacent a flat surface of collar 18 to prevent rotation of the control pin. When adjustment is desired, screw 20 is removed, and the head can then be rotated.

Between reduced portion 17 of the control pin shaft and collar 18, there is an annular groove 21 into which a peg 22 extends. Peg 22 is externally threaded and passes through an internally threaded radial opening in portion 11, in the nature of a set screw, so that end portion 23 thereof protrudes into the groove 21. The axial length of groove 21 is selected to correspond to the maximum axial shifting of control pin 16 in the bore of reduced portion 11 and is directly associated with the axial length of the reduced portion 17 of the control pin. In the event that the shifting path of control pin 16 is exceeded or in the event of non-action of spring 42, which will be described, the arrangement of the annular groove 21 performs the function of insuring the switching for the open mechanism for making the annular shoulder of annular groove 21 fit against part 23 of the bolt to result in axial shifting of cam bushing 10.

In the wall of reduced portion 11 of bushing 10, a locking peg 25 is inserted radially into a bore 24, one end of the peg engages in the operating position of the threading die with a concentric recess 26 of central bore 12 in bearing flange 13. The other end of the peg is supported in the periphery of the shaft part of control pin 16. Bore 24 is provided with a shoulder 27 on which one end of a compression spring 28 is supported, the other end of the spring abutting the shoulder of locking peg 25. Spring 28 performs the function of urging the locking peg radially outwardly in the direction of concentric recess 26. In order to advance the shifting, the ends of the locking peg are conically shaped so that the contact surface thereof against recess 26 conforms to the shape of the recess and, at the other end, conforms to the shoulder of the reduced shaft part 17 of pin 16. The height of the shoulder of reduced portion 17 relative to the outside diameter of the control pin and adapted to the length of the locking peg 25 is at least as great as the depth of the concentric recess 26 outwardly of the bore 12 of flange 13.

A sensor bolt 29 is provided with external threads which engage internal threads in pin 16, the bolt being provided with an enlarged flange 30 which is guided and is axially movable in a bore 31 in die carrier body 1. Guide bolt 29 can be axially adjusted with respect to pin 16 by means of the thread connection, as a result of which the distance between the guide bolt and the end of the workpiece, illustrated as a piece of pipe 32 to be threaded, can be changed. This adjustment is accomplished, as previously described, by removing screw 20 and rotating head 18.

On the side of flange 30 facing pipe 32, the guide bolt is equipped wth cam means including at least one, but preferably four, stop cams 33 which protrude toward and are adapted to be engaged by, the end of the pipe. The outer dimension, indicated as radius 34 in FIG. 2, measured from the central axis 48 corresponds approximately to the radius of the largest diameter of the thread to be formed on pipe 32.

The end surfaces 36 of stop cams 33 are formed as conical surfaces and represent parts of the generated surface of an ideal cone pointing toward the inside of the flange. The separation distances between stop cams 33 are defined by recesses 47 intended to permit passage of cutting dies 4. The angle 35 formed between the perpendicular line to the central axis 48 of the die carrier and the conic surface 36 is approximately equal to half the angle of the flank of the thread to be formed on pipe 32. In order to make possible a uniform fit of stop cams 33 against the end of the pipe, a flange portion 45 can be separately formed as a stop cam carrier, portion 45 and the mating surface of flange 30 having mating generally spherical surfaces, portion 45 being connected to flange 30 by means of a central guide screw 46. Because of the fact that the stop cams 33 are always contacted by a surface processed by the threading dies, that is to say on a flank of the thread of pipe piece 32, even those pipes which have been improperly cut can be provided with a uniformly reproducible length of thread, with the cam surfaces arranged and shaped as described. The angle of the flank of the thread mentioned above refers to the included angle between opposite sides of a single thread as measured in a plane extending longitudinally through the central axis of the pipe.

A compression coil spring 38 is inserted between the flat reverse surface of flange 30 and a shoulder formed in the central bore 37 of bushing 10 for maintaining the position of the sensor bolt in its starting position as shown in FIG. 1, urging the bolt in the direction of arrow B. In order to prevent rotation of the sensor bolt relative to cam bushing 10, a cylindrical peg 39 is inserted through flange 30 and extends parallel with axis 48, th peg engaging an axial bore 40 in bushing 10.

At least one blind hole 41, parallel with axis 48, is disposed to extend through bushing 10 between holding cams 9 and the die carrier, these holes retaining springs 42. The end of the spring abuts an annular surface 43 in the die carrier, the number of holes and springs provided being dependent upon the size of the die head.

For the purpose of driving the die head in a thread cutting machine or in a ratchet wrench, the die carrier is provided with a plurality of driving cams 44 on the exterior surface thereof, three such cams being preferred.

As will be recognized, FIGS. 1 and 2 illustrate the die head in a position to begin thread cutting of a piece of pipe which is supported by a conventional clamping arrangement, not shown. In operation, the die head with theading dies 4 in operating position is moved to the end of the pipe 32, after which the cutting process takes place in a well-known manner with the die head being rotated in the appropriate direction to cut threads on the pipe. Shortly before completion of the cutting process, the end of the pipe comes into contact with surfaces 36 of stop cam 33 and subsequently shifts the guide bolt 29 and thus the control pin 16 in an axial direction until the reduced portion of pin 16 is adjacent the end of locking peg 25, thereby releasing the locking peg and permitting it to be moved inwardly. Through the force of spring 42 in blind hole 41, bushing 10 is shifted axially and locking peg 25 is shifted radially inwardly. Cams 9 are then moved in a direction to be extracted from grooves 8 of threading dies 4 (to the right in FIGS. 1 and 2), these cams acting against the inner surfaces of groove 8 to move dies 4 radially outwardly in unison. When the dies have been moved enough so that they completely clear the formed threads, the piece of pipe can be removed from the die head or the die head can be removed from the pipe.

In order to move the threading dies 4 back into their operating position, pressure is exerted on collar 18 to the left, causing cam bushing 10 and, consequently, holding cams 9 to be shifted further into holding grooves 8 of the threading dies 4, again returning the dies radially inwardly toward central axis 48. In this position, locking peg 25 is moved back into annular recess 26 in flange 13 and can be shifted with the aid of spring 28 via the shoulder of the reduced shaft part into recess 26. By a further shifting of control pin 16, the sensor bolt is moved into its starting position which corresponds to the beginning position for the thread cutting operation.

In order to adjust the cutting threads of dies 4, screw 1t in flange 13 is loosened and the flange can be rotated, causing bushing 10 and cams 9 to be shifted axially. After the alignment and adjustment is completed, screw 15 is tightened and flange 13 is secured against twisting. In order to adjust the axial position of the sensor bolt 29 relative to the end of the pipe and to thus determine the length of thread to be cut, locking screw 20 is removed and pin 16 is rotated, causing bolt 29 to be moved to the right or left, depending upon the direction of rotation. After that adjustment is completed, one of the flat surfaces of collar 18 is aligned with the threaded hole for screw 20 and the screw is again inserted.

The advantages obtainable with the present invention consist especially in the fact that an automatically opening die head is provided with a minimum of mechanical moving parts, the opening or closing mechanism of which may also be operated without danger in the case of a rotating die head. Furthermore, as a result of the special development of the intervals between the projections having the threading die guides, a perfect runoff of the cuttings is created and the accumulation of cuttings is thus safely avoided. This has a decisive influence of the service life of the tools and limit the maintenance of the die head to a minimum. Furthermore, maintaining a constant length of a thread is guaranteed since the triggering of the opening mechanism is always accomplished by a cleanly processed surface.

While one advantageous embodiment has been chosen to illustrate the invention, it will be understood by those skilled in the art that various changes and modifications an be made therein without departing from the scope of the invention as defined in the appended claims.

What is claimed is:

1. A die head having replaceable threading dies comprising the combination of a die carrier comprising a generally cylindrical body having a hollow interior and a central axis, a plurality of projections extending axially from one end of said body and means defining a generally radially extending slot in each of said projections;

a plurality of threading dies, each of said dies being radially slidable in one of said slots, said dies having inwardly facing thread forming surfaces defining a cavity to receive a workpiece;

a cover plate on each of said projections;

means in each of said threading dies for defining a cam slot opening generally away from said cover plate;

a bearing flange axially adjustably mounted in the other end of said body, said bearing flange having a central opening therethrough;

a cam bushing in said carrier having a plurality of cams enaging said slots in said threading dies, said cam bushing being axially shiftable relative to said body and having a reduced diameter portion extending into said opening in said bearing flange;

means defining a central bore in said reduced diameter portion of said busing;

a control pin in said central bore, said pin being axially adjustable and lockable against movement therein;

a sensor bolt coupled to said control pin;

a flange on said bolt; and stop cam means on said flange and facing said cavity, said stop cam means having a conical surface contactable by the workpiece for axially moving said flange, said sensor bolt, said control pin and said bushing when contacted and moved by the workpiece, thereby moving said threading dies radially outwardly.

2. A die head according to claim 1 and further comprising spring means extending between said bushing and said bolt flange for urging said bolt flange toward said cavity.

3. A die head according to claim 1 wherein said conical surface forms an angle, relative to said central axis, which is substantially equal to the flank angle of the thread to be cut on the workpiece.

4. A die head according to claim 1 wherein said stop cam means comprises a generally disc-shaped member supporting said conical surface, said member being rotatably attached to said bolt flange, the mating surfaces of said member and said flange being generally spherical.

5. A die head according to claim 1 wherein the outer radial dimension of said conical surface is substantially equal to the outer diameter of the threads being cut on the workpiece.

6. A die head according to claim 1, wherein said bearing flange is externally threaded and threadedly engages internal threads on said body to permit axial adjustment, said flange having means thereon for locking said flange against movement relative to said body.

7. A die head according to claim 1 wherein said control pin includes means for defining an annular groove in the exterior surface thereof,
and said cam bushing includes a bolt extending through said reduced diameter portion into said groove.

8. A die head according to claim 1 wherein said control pin is threadedly coupled to said sensor bolt.

9. A die head according to claim 1 which includes means for locking said control pin against rotary movement relative to said sensor bolt.

* * * * *